(12) United States Patent
Henriksen (10) Patent No.: US 7,105,942 B2
(45) Date of Patent: Sep. 12, 2006

(54) PLANT, GENERATOR AND PROPELLER ELEMENT FOR GENERATING ENERGY FROM WATERCURRENTS

(75) Inventor: Svein Dag Henriksen, Harstad (NO)

(73) Assignee: Hydra Tidal Energy Technology AS, Harstad (NO)

( * ) Notice: Subject to any disclaimer, the term of this patent is extended or adjusted under 35 U.S.C. 154(b) by 178 days.

(21) Appl. No.: 10/482,311

(22) PCT Filed: Jul. 8, 2002

(86) PCT No.: PCT/NO02/00249

§ 371 (c)(1),
(2), (4) Date: Dec. 30, 2003

(87) PCT Pub. No.: WO03/006825

PCT Pub. Date: Jan. 23, 2003

(65) Prior Publication Data
US 2005/0236841 A1    Oct. 27, 2005

(30) Foreign Application Priority Data
Jul. 11, 2001   (NO) ................... 20013437
Feb. 18, 2002   (NO) ................... 20020800

(51) Int. Cl.
F03D 9/00  (2006.01)
F02N 11/04 (2006.01)
H02D 9/04  (2006.01)
H02P 9/04  (2006.01)
F03B 13/12 (2006.01)

(52) U.S. Cl. ............... 290/55; 415/3.1; 415/7; 415/60; 290/42; 290/43; 290/53; 290/54

(58) Field of Classification Search ........... 290/55; 415/3.1, 7, 60
See application file for complete search history.

(56) References Cited

U.S. PATENT DOCUMENTS

| | | | | | |
|---|---|---|---|---|---|
| 1,074,292 | A | * | 9/1913 | Reynolds | 416/86 |
| 1,263,865 | A | * | 4/1918 | Dale | 415/60 |
| 1,443,626 | A | * | 1/1923 | Hinckley | 60/500 |
| 2,256,011 | A | * | 9/1941 | Ballou | 33/30.5 |
| 2,782,321 | A | * | 2/1957 | Fischer | 290/4 R |
| 3,965,365 | A | * | 6/1976 | Parr | 290/53 |

(Continued)

FOREIGN PATENT DOCUMENTS

EP    1467091 A1 * 10/2004

*Primary Examiner*—Nicholas Ponomarenko
*Assistant Examiner*—Pedro J. Cuevas
(74) *Attorney, Agent, or Firm*—Harness, Dickey & Pierce, PLC (57) ABSTRACT

A plant, generator and rotating member for the production of power from currents in a body of water, comprising a fixedly mounted of floating structure, and a plurality of replaceable generator units (750) supported by the structure and which are driven by the water currents. The structure comprises arms (615, 720, 730). The rotating member (400) comprises a plurality of member sections (410) rotatably mounted on a shaft (405) between an end piece (407) and a tip (406). The generator comprises a contra-rotating rotor (550) and stator (800) connected to respective shafts (500, 820) and bearings, where the stator frame (800) is axially supported (810) on the first shaft (500) and the first shaft (500) at one end thereof is axially supported (810) on the stator frame. The generator according to the invention can be used for the production of electric power, and as an electromotor for the production of mechanical rotational energy.

14 Claims, 10 Drawing Sheets

U.S. PATENT DOCUMENTS

| | | | |
|---|---|---|---|
| 3,986,787 A * | 10/1976 | Mouton et al. | 415/7 |
| 4,039,848 A * | 8/1977 | Winderl | 290/55 |
| 4,239,976 A * | 12/1980 | Collard | 290/42 |
| 4,319,454 A * | 3/1982 | Lucia | 60/506 |
| 4,383,182 A * | 5/1983 | Bowley | 290/43 |
| 4,383,797 A * | 5/1983 | Lee | 415/7 |
| 4,408,455 A * | 10/1983 | Montgomery | 60/505 |
| 4,560,884 A * | 12/1985 | Whittecar | 290/42 |
| 4,576,569 A * | 3/1986 | Koblanski | 431/1 |
| 4,613,279 A * | 9/1986 | Corren et al. | 415/121.2 |
| 4,781,023 A * | 11/1988 | Gordon | 60/506 |
| 4,850,190 A * | 7/1989 | Pitts | 60/398 |
| 4,864,152 A * | 9/1989 | Pedersen | 290/53 |
| 4,872,805 A * | 10/1989 | Horiuchi et al. | 415/7 |
| 4,931,662 A * | 6/1990 | Burton | 290/42 |
| 5,789,826 A * | 8/1998 | Kumbatovic | 290/53 |
| 5,921,082 A * | 7/1999 | Berling | 60/325 |
| 6,091,161 A * | 7/2000 | Dehlsen et al. | 290/43 |
| 6,127,739 A * | 10/2000 | Appa | 290/55 |
| 6,278,197 B1 * | 8/2001 | Appa | 290/55 |
| 6,294,844 B1 * | 9/2001 | Lagerwey | 290/55 |
| 6,492,743 B1 * | 12/2002 | Appa | 290/55 |
| 6,531,788 B1 * | 3/2003 | Robson | 290/43 |
| 6,551,053 B1 * | 4/2003 | Schuetz | 415/3.1 |
| 6,559,552 B1 * | 5/2003 | Ha | 290/54 |
| 6,616,403 B1 * | 9/2003 | Smith et al. | 415/3.1 |
| 6,647,716 B1 * | 11/2003 | Boyd | 60/398 |
| 6,933,623 B1 * | 8/2005 | Carroll et al. | 290/42 |
| 6,935,832 B1 * | 8/2005 | Platt et al. | 415/8 |

* cited by examiner

PLANT, GENERATOR AND PROPELLER ELEMENT FOR GENERATING ENERGY FROM WATERCURRENTS

TECHNICAL FIELD

The invention relates to apparatus for extracting energy from water currents. More specifically, the invention relates to plants for the production of energy from currents in a body of water, comprising a structure capable of resting on a bottom below the body of water or of floating on the body of water and a plurality of replaceable generator units supported by the structure and which are driven by the water currents, and a rotating member for use as energy supplier in a generator unit located in a body of water a generator, more specifically a generator in which the stator and the rotor are rotatable relative to one another. The plant utilises currents below the surface of oceans, seas, rivers or other bodies of water. Such currents may, e.g., be caused by tidal variations and/or underwater topography (e.g., channels, riverbeds or other narrow passages under water).

The generator according to the invention can produce electric power by utilising any source of energy, but is especially suitable for being driven by wind and water currents, in particular low-speed water currents. The generator can also be operated as an electromotor.

BACKGROUND ART

Current in large bodies of water, as for instance that generated by tidal variations, is a renewable source of energy which thus far has not been exploited in Norway. This is the case even though such currents are highly predictable and readily available per se along the Norwegian coast.

When currents in large bodies of water (e.g., oceans or rivers) are forced through channels or other narrow passages, the velocity of flow will increase and will to a very great extent be aligned. The current in the central region of the narrow passage will have an almost equal velocity across the whole of the cross-section in question, which means that it is advantageous to position a power generator in this region.

There are a number of known apparatus and methods for the production of energy from ocean currents.

Norwegian Patent Application 1999 1984 (Hammerfest Strøm) describes a plant for the production of electric power from ocean and river currents. The whole of the plant is located below the surface of the water and comprises a plurality of turbines having blades, a support system, a system of stays and a generator. The turbine shafts are oriented perpendicular to the direction of movement of the water, and the blades are wing-shaped so that the turbine rotates in the same direction, regardless of the direction of movement of the water. The turbine shafts are supported in a framework of buoyancy tanks, secured to the support and bearing system. The plant is built up of modules. The plant has positive buoyancy regulated by the buoyancy tanks and a system of stays secured below the surface of the water, so that the plant is held below the surface of the water by the system of stays. The plant employs conventional blades.

Danish Patent 155454 (Hans Marius Pedersen) describes a floating water current power station which consists of a ring-shaped pontoon which by means of a bitt is anchored to anchors on the bottom. All the turbines are replaceable and are arranged on a common beam and can as a unit be swung up to the surface within the area defined by the ring pontoon. The power station may move around the bitt, the upper end of which is connected to a front pontoon and the lower end of which is secured to the anchors.

U.S. Pat. No. 5,440,176 describes a submersible water turbine plant comprising turbines/generators in different combinations suspended below a submerged platform of the tension leg type.

Generators with contra-rotating rotor and stator are well known. In the field of wind energy technology coaxially contra-rotating propellers are known, inter alia, as a measure for extracting the rotational energy with which the air current is supplied when it passes the first propeller. The contra-rotating propellers may be on the same side of the generator, or on each side thereof. The propellers are either connected by means of gears to the same generator, or one propeller is connected to the rotor and the other propeller is connected to the field coils. The previously known contra-rotating propellers connected to the same generator require complex gearwheel drive and transmissions, which results in further energy loss. A contra-rotating propeller connected to the rotor and the stator respectively is much simpler from a mechanical point of view, but in the solutions known hitherto the field coils require slip rings which may render the solution more complex, in addition to there being an electrical and mechanical power loss.

In the known cases where the propellers are on each side of the generator (and the tower), it is preferable as a rule that the downstream propeller should be smaller than the upstream propeller, and set to stall at a higher wind speed.

On the production of electricity from water currents, a lowest possible propeller speed is required. The consequence is a high torque and it is very difficult to dimension a standard gear solution.

Known generator solutions usually have a constant rotational speed (pitch adjustment of the propeller) and stator that is stationary. This results in the generator housing having a very large diameter, which is a disadvantage.

U.S. Pat. No. 4,291,233 describes a wind turbine generator having oppositely rotating rotor and stator. Rotational energy from a wind-driven turbine (propeller) having a preferably horizontal shaft is transformed into rotational energy in two preferably concentric shafts, via a bevel gear drive. The propeller shaft is attached to the bevel gear drive, which engages with upper and lower pinion gears that rotate in opposite directions. The pinion gears are secured to respective shafts which are preferably concentric and arranged vertically. The two shafts—which rotate in opposite directions—are connected to a rotor and a stator respectively.

DE 43 04 577 A1 describes a wind turbine generator having two pairs of vanes connected to a rotor and a stator respectively in order to turn the pairs of vanes in opposite directions. Both pairs of vanes are arranged on the same side of the generator, and function as two contra-rotating, double-bladed propellers. This document does not disclose any further details with regard to the interaction of the stator and the rotor.

DE 196 43 362 describes a wind or turbine generator having oppositely rotating rotor and stator. A shaft 8—having a first end 10 connected to a turbine or propeller 3—is secured to a rotor 9. A stator 13 is secured to a second shaft end 11, which in turn is connected to a turbine or propeller 4. The shaft end 11 is supported on the shaft 8 via a bearing 14, so that the rotor and the stator can rotate relative to each other.

Reference is also made to an auxiliary rotor 17 and an auxiliary stator 18, where the rotor 17 is secured to the housing. Thus, the relative speed between the components 17 and 18 is half of the speed between the components 9 and 13.

The known contra-rotating generators can be divided in to two main groups:
  (i) the rotor and stator are driven by the same turbine or propeller
  (ii) the rotor and stator are supplied with rotational energy from their respective turbine or propeller.

The first category of generator can be illustrated by U.S. Pat. No. 4,291,233 (described above). The disadvantage of this generator is that much energy is lost in the many transmissions that are used to contra-rotate the stator. Furthermore, this generator is bulky, and will probably be expensive both to manufacture and to maintain. Therefore, there is a need for a simplified type of generator, where the rotor and the stator are driven by the same turbine or propeller, and where a minimum of gear transmissions are used and the use of bevel gears is avoided.

The second category of generator can be illustrated by DE 196 43 362 (described above). The drawback with this generator is that it includes an outer member which does not rotate, and which is equipped with a conventional stator winding. This housing also has base lugs and takes up about half of the total torque.

The main cylinder is assumed to have magnets on both sides and is rotated by a separate shaft. Within this rotor there is another rotating stator (or rotor). The torque that arises between the innermost rotor (9) and the magnet rotor (13) does not impact on the base lugs, but is taken up in the magnetic field between the propellers. Therefore, there is a need for a simplified type of generator, where the rotor and stator are supplied with rotational energy from their respective turbine or propeller, where the base is not required to take up the torque in the generator between the rotor and the stator, and where the torque of the propellers is used in its entirety to generate electric power.

DISCLOSURE AND SUMMARY OF THE INVENTION

Thus, according to the invention there is provided a plant, a generator and a propeller-type member for the production of energy from water currents of the type described above and as disclosed in the preamble of the attached patent claims.

The plant according to the invention comprises a structure capable of resting on a bottom below said body of water, and a plurality of replaceable generator units supported by the structure and which are driven by the water currents. The plant is characterised in that the structure comprises a plurality of nodal elements having a respective nodal centre and substantially horizontal arms projecting therefrom, and that each nodal centre is made in the form of a bushing for a height-adjustable leg extending towards the bottom.

The plant according to the invention thus comprises a structure capable of resting on a bottom (B) below said body of water, and a plurality of replaceable generator units supported by the structure and which are driven by the water currents, wherein the plant is characterised in that it can be positioned on the bottom below a body of water using said supporting legs which are movable through said bushings, and that the plant can selectively, with the aid of the supporting legs, be brought to a chosen height in the body of water in order to optimise the position of the generator in the body of water, or above the surface of the water so that said generator units are above the surface of the water.

The plant according to the invention also comprises a floating plant for the production of energy from currents in a body of water, comprising a supporting structure supported by a plurality of float members, characterised by a plurality of supporting arms which at one end thereof are pivotally attached to the structure, and at the other end thereof are attached to respective generators. In one embodiment the supporting arms comprise at least one joint between their first and second ends, so that each supporting arm can be folded about the joint in order thereby, concurrently with the swinging of the supporting arm about the pivotal connection of its first end with structure, to raise the respective generator above the surface of the water.

The rotating member according to the invention comprises a shaft mounted on a hub on a shaft extending from a generator (not shown) to a generator housing and intended for rotation actuated by currents in the body of water, and characterised in that the rotating member comprises
  an inner end piece mounted on said shaft, at the attachment of the shaft to the hub;
  a tip mounted at the outer end of said shaft;
  a plurality of member sections mounted on said shaft between said end piece and tip.

In one embodiment the member sections are rotatably mounted on and adjustable about said shaft.

In one embodiment the tip is rotatable and adjustable about said shaft.

According to the invention, there is also provided a generator of the type described above and Thus, the generator is characterised in that it comprises a transmission member fixedly connected to the shaft and which via transmission means is attached to the stator, whereby—when the shaft rotates—the stator is rotatable in the opposite direction of the shaft.

In a second embodiment, the generator according to the invention is characterised in that the second shaft at one end thereof is connected to a stator frame, axially supported on the first shaft; and the first shaft at one end thereof is axially supported in said stator frame.

BRIEF DESCRIPTION OF THE DRAWINGS

Embodiments of the invention are set forth in the attached patent claims, and in the following description with reference to the attached drawings. It should be appreciated that the drawings merely illustrate typical exemplary embodiments and thus should not be regarded as defining the limits of the invention. The same reference numerals are used to indicate the same parts in the drawings, and these are also used in the description below.

FIGS. 6*a*–6*c* are perspective views of a second embodiment of the tidal power plant according to the invention with the generators in a dropped position.

FIG. 6*a* is an end view of the plant;

FIG. 6*c* is a top view of the plant.

DETAILED DESCRIPTION OF EMBODIMENTS OF THE INVENTION

In one embodiment, the plant according to the invention comprises a structure capable of resting on a bottom B below the surface S of a body of water. The structure supports a plurality of replaceable generator units 750 which are driven by the water currents. The plant structure is built up of a plurality of nodal elements 700 having a respective nodal centre, and substantially horizontal supporting members 720 and connecting members 730 projecting therefrom. Upper and lower bushings 711, 712 for a height adjustable leg 760 extending towards the bottom B pass through each nodal centre.

The nodal elements 700 are interconnected by means of intermediate connecting members 740 between the connecting members 730.

The generator units 750 are secured to substantially vertical supporting members 749, each of which may be secured to the horizontal supporting members 720 or the intermediate connecting members 740.

For production and hydrodynamic reasons, the arms, the supporting legs, the optional connecting members and the elongate supports are made in the form of tubular members. Other cross-sectional shapes (e.g., ellipse, rectangle) and configurations (e.g., latticework) should be regarded as being embraced by the present invention, even though such forms and configurations are not considered to be ideal.

To facilitate the mobility of the plant during installation and subsequent relocation, the supporting legs contain one or more ballastable chambers. At the same time, the supporting and connecting members constitute float members. When the supporting legs 760 are deballasted, the plant is mobile. When the supporting legs 760 are ballasted, the plant is stationary and can function in the current conditions for the purpose for which it is designed without additional anchoring.

When in operation, each individual generator unit should normally be fixedly mounted to the supporting member, and the rotating member(s) of the generator should be capable of rotating both clockwise and anti-clockwise, depending upon the direction of the water current. However, in one embodiment the generator housing is pivotally supported about a vertical axis at the free end of the respective vertical supporting member.

Figure 1:
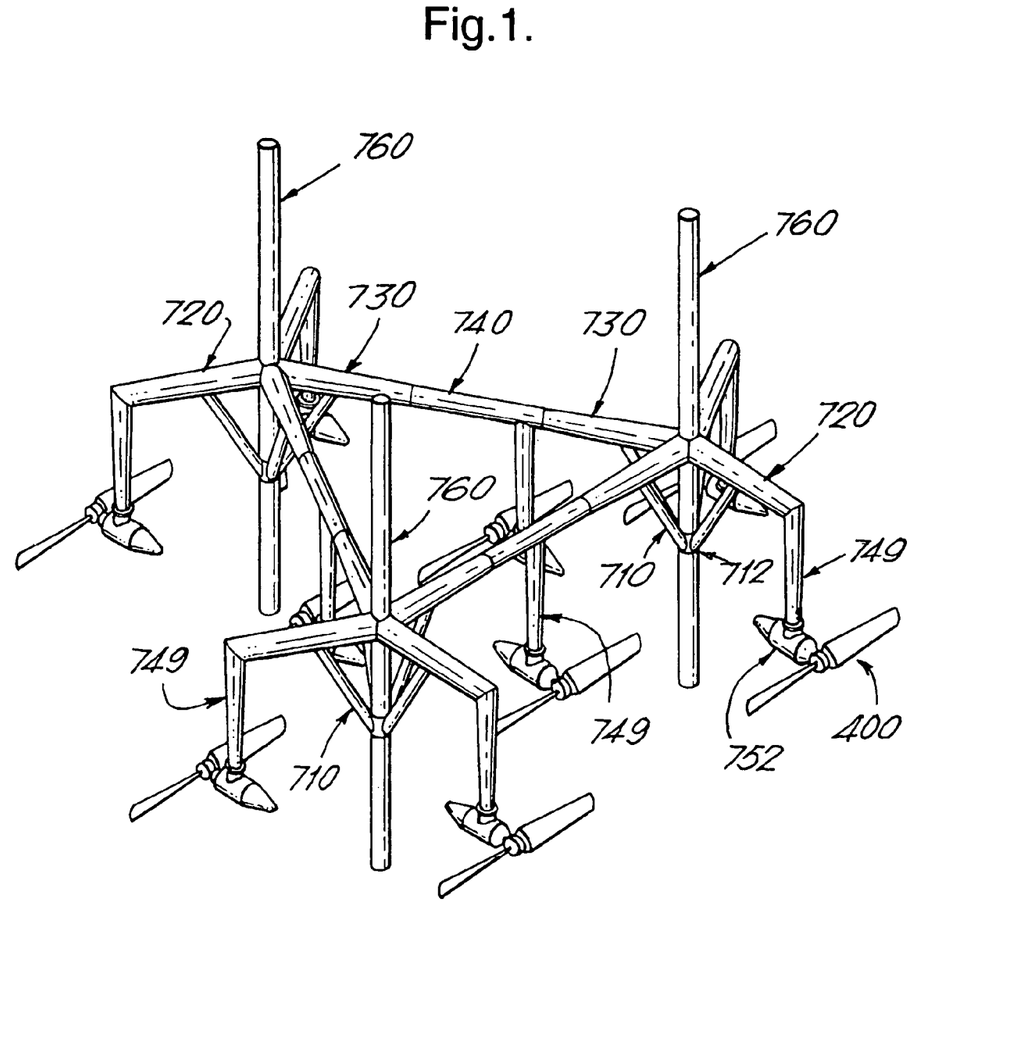
FIG. 1 is a perspective view of a first embodiment of a tidal power plant according to the invention.
Figure 2:
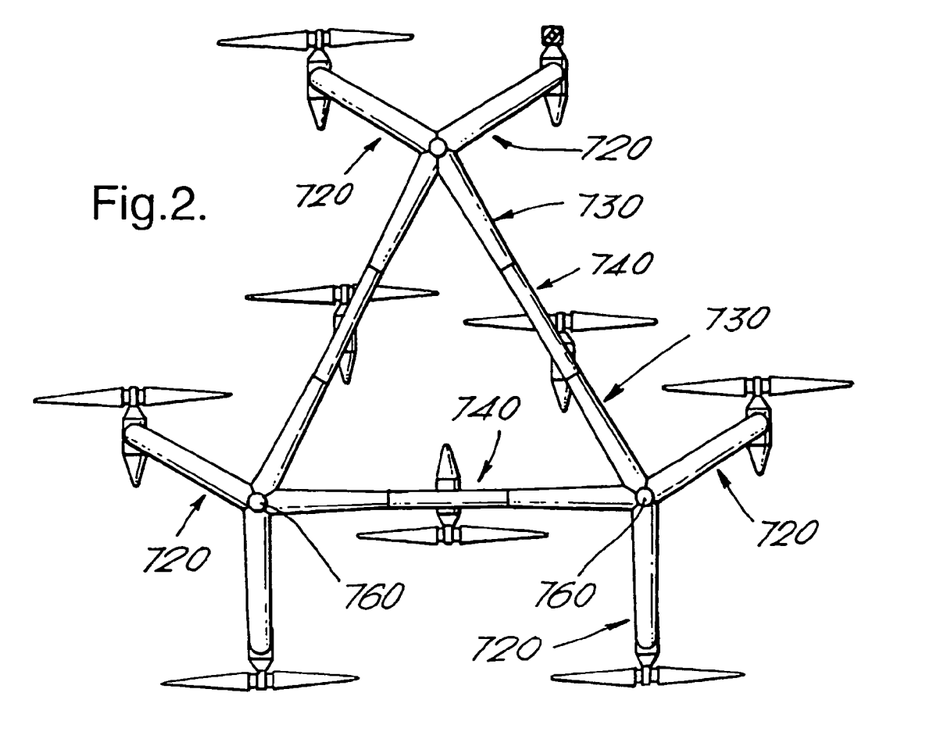
FIG. 2 is a top view of the tidal power plant in claim 1.
Figure 3:
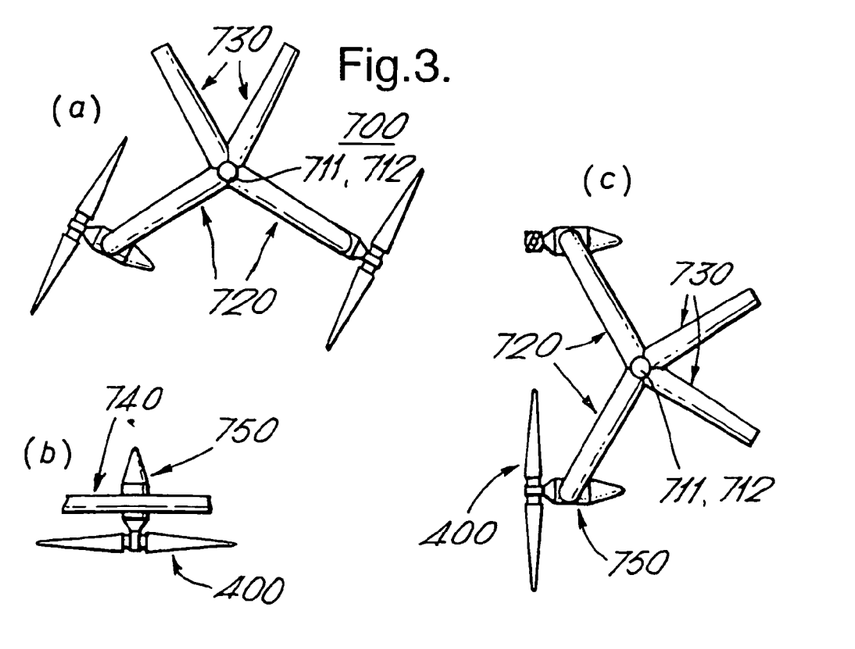
FIGS. 3*a*–3*c* are top views of the tidal power plant in FIG. 2 and show two nodal centres (FIGS. 3*a* and 3*c*) and one intermediate piece (FIG. 3*b*).
Figure 4:
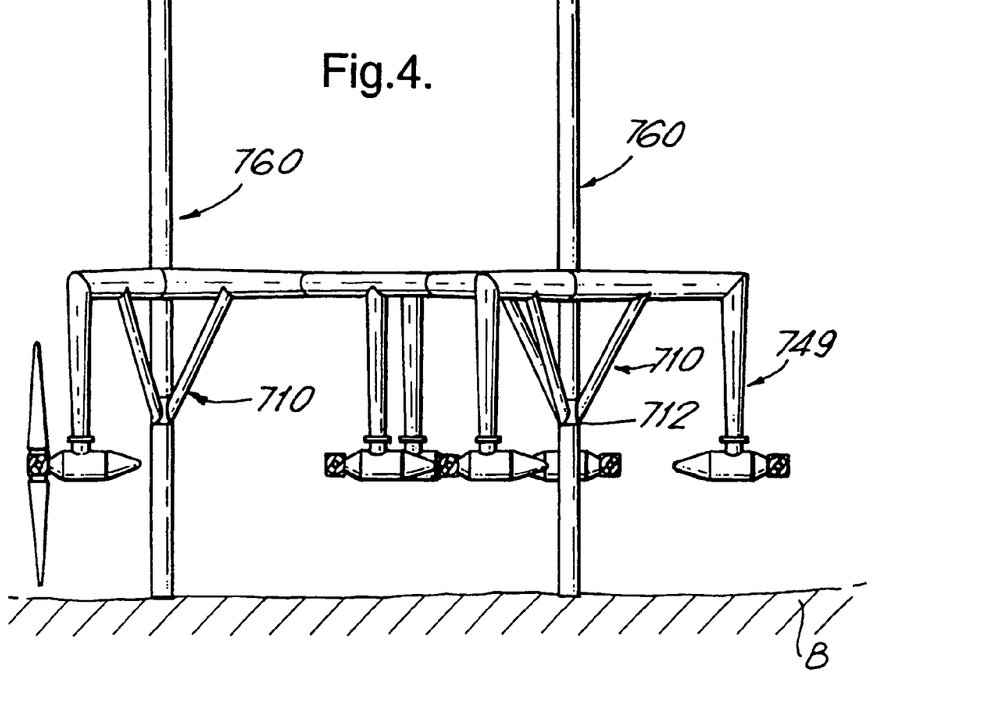
FIG. 4 is a side view of the tidal power plant in FIG. 1.

FIGS. 1 and 2 show a plant consisting of three nodal elements 700 assembled by means of a corresponding number of connecting members 740. The plant thus describes an equilateral triangle with one supporting leg 760 arranged in each corner. A configuration of this kind is favourable as the plant is statically determinant when it is ballasted towards the bottom.

To be able to cover as large a cross-sectional area as possible, the generator units are arranged so that the individual planes of rotation formed by the rotation of the rotating members 400 essentially overlap each other. Thus, a minimum amount of water flows round the generators.

Figure 5:
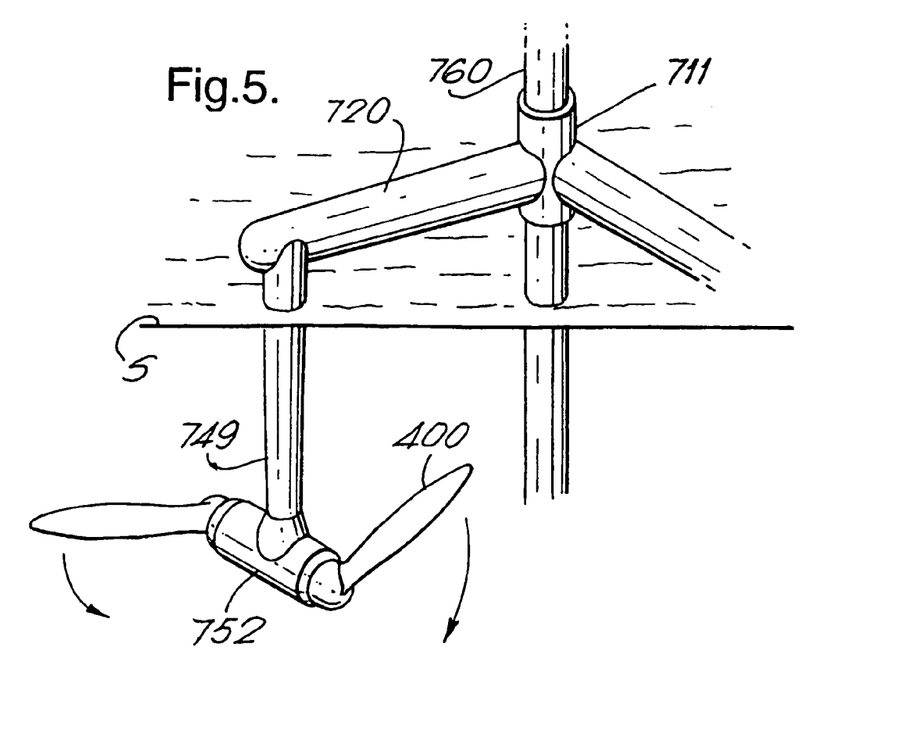
FIG. 5 is a perspective view of one embodiment of a turbine unit and rotating member, and shows a variant where the generator units are equipped with one rotating member rotatably arranged on each side of said generator housing, and where the rotating members are contra-rotating relative to one another.

Although each generator unit will normally have two or more rotating elements (see FIG. 1), it is also within the scope of the present invention to have generator units equipped with just one rotating member 400, and these can also be arranged on each side of a generator housing (see FIG. 5). In this case, the rotating members are of course contra-rotating relative to each other.

A central aspect of the invention is that the plant can be positioned on the bottom B via supporting legs 760. These are movable through bushings 711, 712, so that the plant can selectively, by means of the supporting legs, be brought into a chosen height in the body of water. A "jack-up" principle of this type is well known, but not in connection with plants such as those covered by the application. Because it is possible to adjust the height of the plant in the water, the generators can easily be raised above the surface of the water for maintenance, repair or replacement. Furthermore, the location of the generators in the body of water is optimised in relation to the current conditions and the topography of the bottom. With the adjustable supporting legs according to the invention, the plant can thus easily be installed on a very uneven bottom.

In another embodiment, the plant according to the invention comprises contra-rotating turbines placed on a steel structure which floats in the water, see FIGS. 6*a*–6*d*.

Figure 6A:
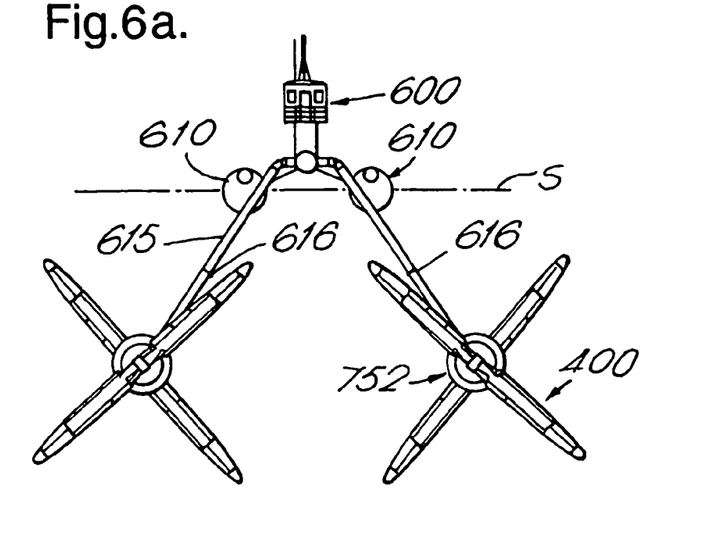
Figure 6B:
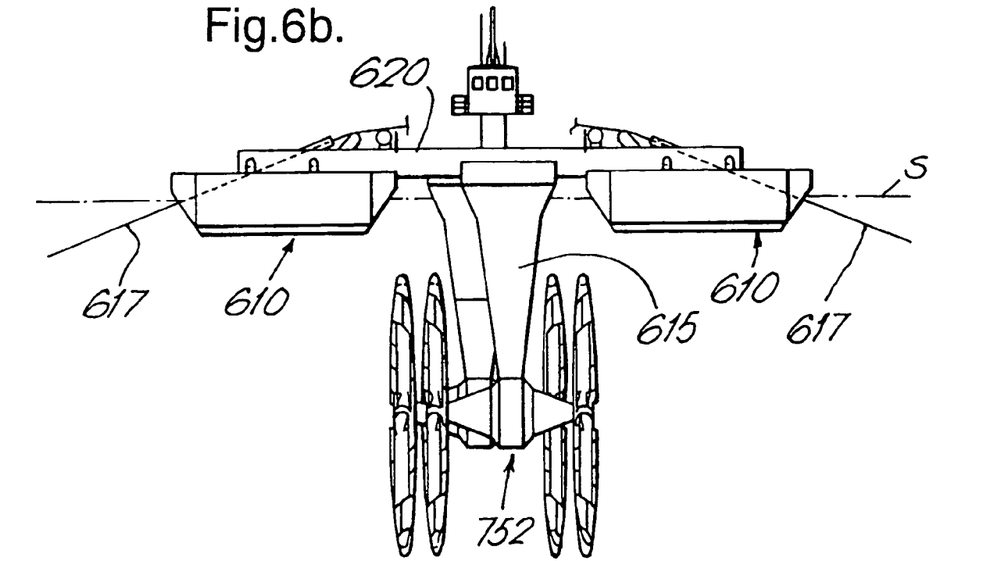
FIG. 6*b* is a side view of the plant.
Figure 6C:
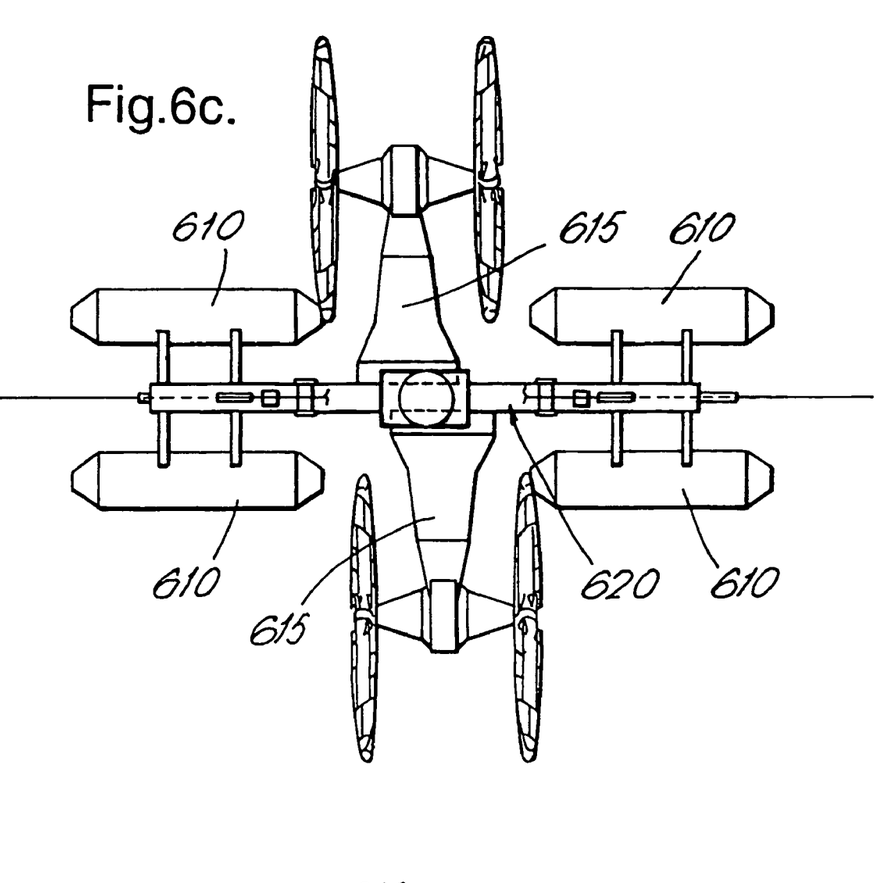
Figure 6D:
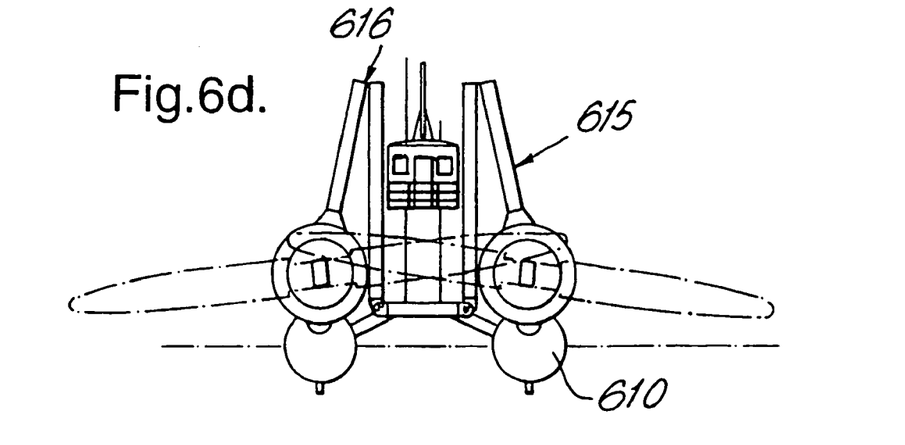
FIG. 6*d* shows the plant in FIGS. 6*a*–6*b* seen from one end and with the generators in a retracted position.

The plant comprises a platform 620 having a plurality of buoyancy members 610, preferably one in each corner as can be seen in FIG. 6*c*. The requirement of stability, both lateral and longitudinal, is thus met with a minimum of displacement. A plurality of supporting arms 615 extending out from the platform to each side each hold a generator 752 and two turbines on its side, and are secured to a longitudinal pipe which in turn is secured to all four pontoons. The supporting arms are hinged at their point of attachment and about halfway along. Operation of the supporting arms is effected using hydraulics.

The arrangement permits standard, known anchoring using anchor (not shown) and chain 617 in both directions: either one or two anchors in each direction, or that one anchor in each direction holds two platforms. This means that the platforms can be anchored in the longitudinal direction at a desired distance, and so close to each other that turbines run clear of each other. By anchoring several units side by side, the lateral distance will also be adjustable or securable by means of chain.

After anchoring has been completed, chain cutters and anchor winches could be removed and used on the next platform etc. During maintenance and optionally when moving to a maintenance/repair facility (e.g., every third year), the anchor winch is put back and chain is lowered to the bottom. On reinstallation, the chain is winched into the platform and reattached.

Production load from turbines is used to weigh the anchors in each direction. On the opposite side of the anchor load, the chain slack is winched in, and when the water currents turn, the same takes place again on the opposite side. In this way, a secure and stable position is obtained as the current moves in two directions.

If production loads become extremely large, due to possible defects in the control system so that load increases and the anchors perhaps give, this is not a catastrophe. Alternatively, booms could automatically be released to the surface (in the event of defects or problems with the control of turbines or generators). As generator and turbine have positive buoyancy in the water, a great amount of power is not needed to obtain this stop position.

It can also be seen that there are very substantial dynamic forces which act on this kind of turbine, and that this in turn can result in vibrations and fatigue. Compared with a fixed installation on the bottom, a floating platform will obtain considerably greater dampening of vibrations of this type. Thus, the concept is not subject to the same danger of fatigue.

Because the platform floats with little draught (e.g., just 1.5 meters), supporting arms 615 and turbines can easily be moved into the platform side in a "scissored position" relative to one another, and transport or towing in the floating position will be simple.

If four propeller blades are dismantled, the whole rig can easily be placed on most slips. Thus, underwater maintenance can be simplified (be possible) and service life can be extended considerably.

In the next stage this results in a great second hand value, as it is mobile, but also because the overall economy of the concept may be better than that of a fixed anchored monopile from the bottom.

Figure 7:
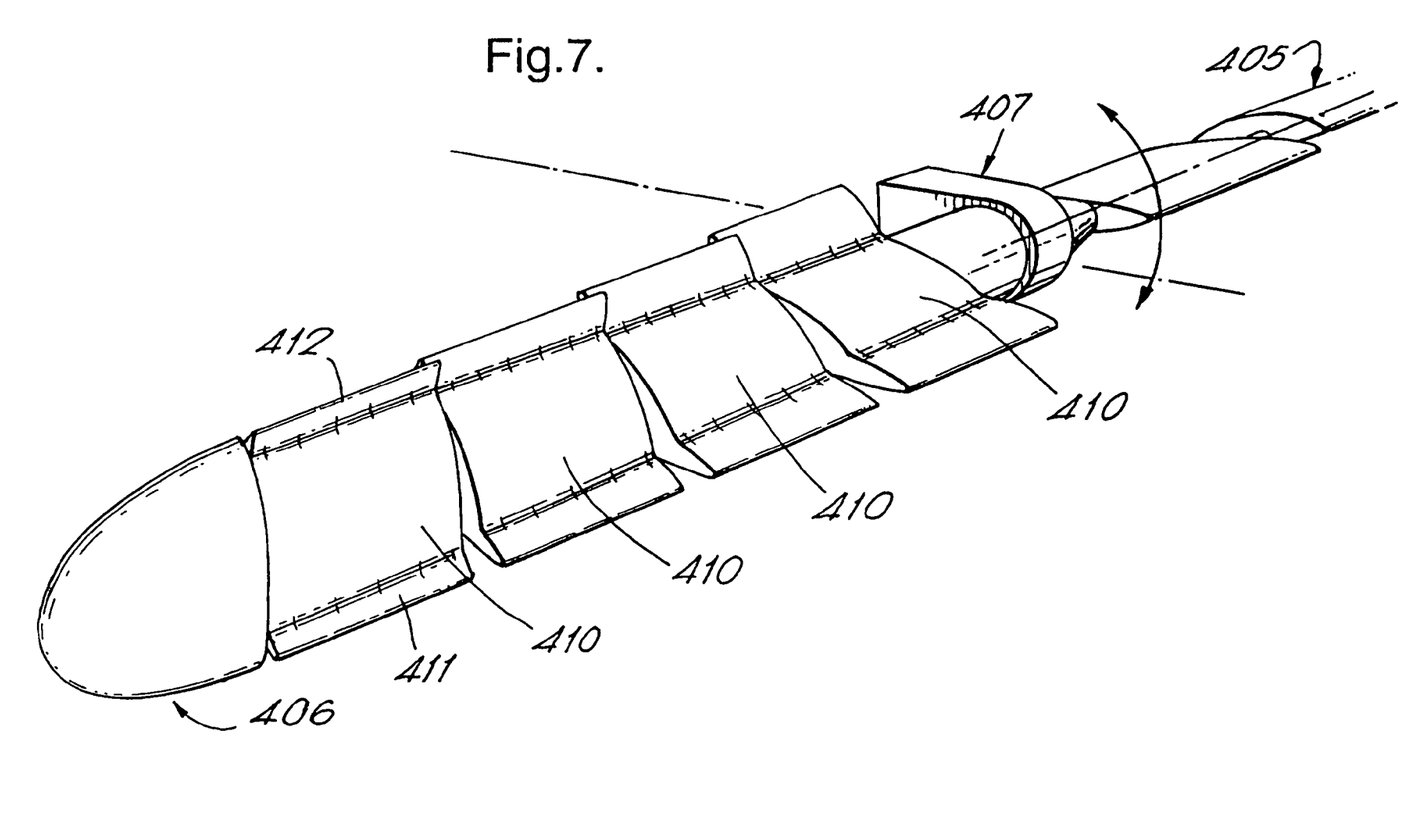
FIG. 7 is a perspective view of a first embodiment of a rotating member according to the invention.
Figure 8A:
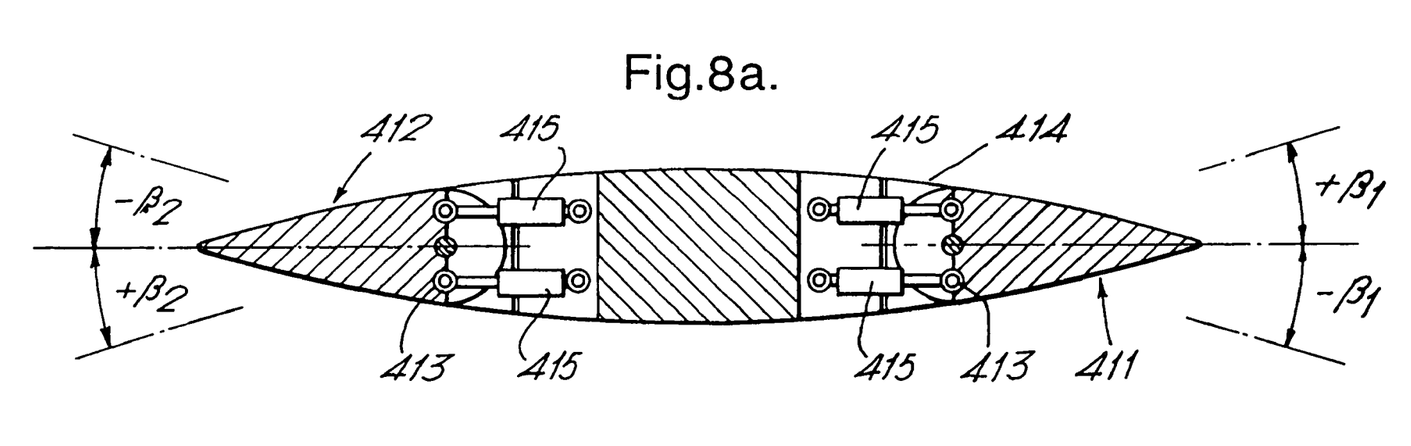
FIG. 8 is (a) a simplified sectional diagram of a rotating member section, and (b) a top view of a rotating member according to the invention.
Figure 8B:
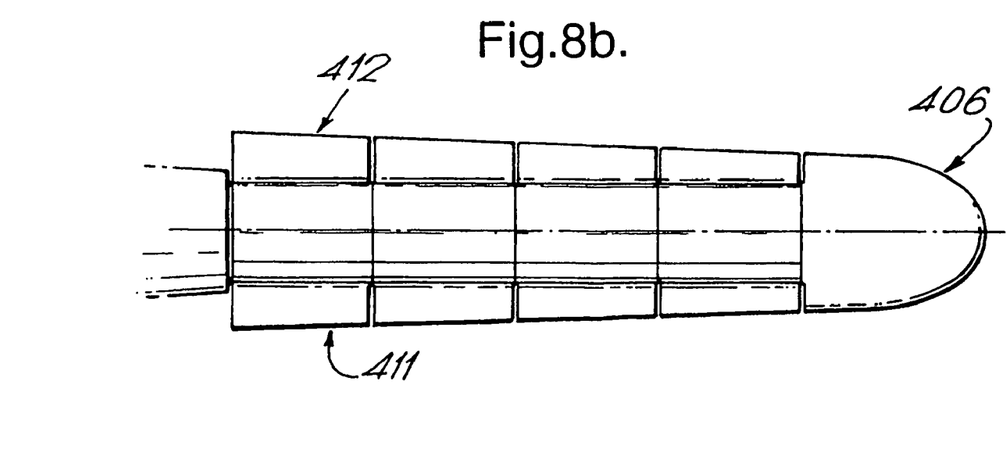
Figures 9, 10:
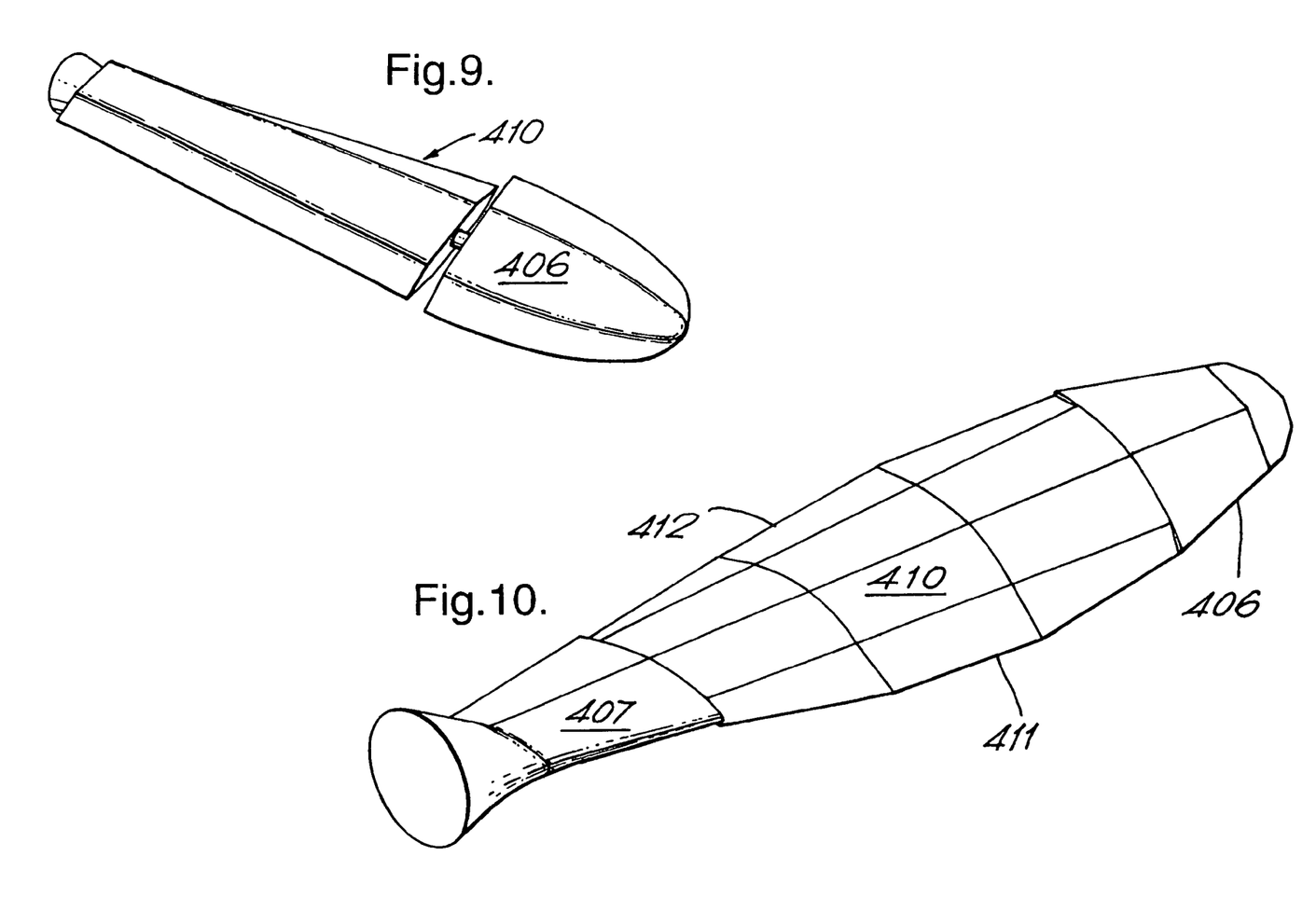
FIG. 9 is a perspective view of a second embodiment of the rotating member according to the invention.
FIG. 10 is a perspective view of a third embodiment of a rotating member according to the invention.

The present invention also comprises a rotating member 400 designed for rotation actuated by currents in the body of water so as to function as energy supplier in a generator unit located in a body of water. The rotating member, as illustrated in different embodiments in FIGS. 7, 9 and 10, is built up around a shaft 405 which is mounted (preferably at right angles) on a hub on the generator shaft. The rotating member according to one embodiment of the invention comprises an inner end piece 407 mounted on the shaft 405 at the attachment of the shaft to the hub, a tip 406 mounted at the outer end of the shaft, and a plurality of member sections 410 rotatably mounted on the shaft 405 between the end piece 407 and the tip 406 (ref. FIG. 7).

In the embodiment shown in FIG. 7, each member section 410 is individually selectively pivotal and adjustable about said shaft, in order that the rotating member as such can assume the optimal pitch in relation to the water current.

FIG. 9 shows another embodiment of the rotating member, and comprises just one member section 410 fixedly mounted on the shaft 405. In this embodiment the tip 406 is selectively pivotal and adjustable about a shaft.

FIG. 10 shows yet another embodiment of the rotating member, and comprises just one element section 410 fixedly mounted on the shaft 405. In this embodiment, the tip 406 is also fixedly mounted on the shaft.

Each member section 410 comprises at least one servo rudder 411, 412 rotatably mounted at the fore and aft edge of the member section via respective rudder axles 413. This can be seen from both FIGS. 7 and 10. The servo rudders 411, 412 are selectively and mutually independently rotatable by means of respective actuators 415, and can be rotated to any angle within a pre-defined range ($\pm\beta_1$, $\pm\beta_2$) so as to assume the optimal angle of action relative to the water current.

The plant according to the invention also comprises a generator, which will now be described with reference to FIGS. 11 and 12.

The fundamental idea of the invention is, on the basis of a direct-driven generator, to combine a very low input speed (substantial torque) and a large relative speed (e.g., 25 rpm at 10 rpm of the input shaft), by contra-rotating the stator. Thrust bearing is also incorporated.

Figure 11:
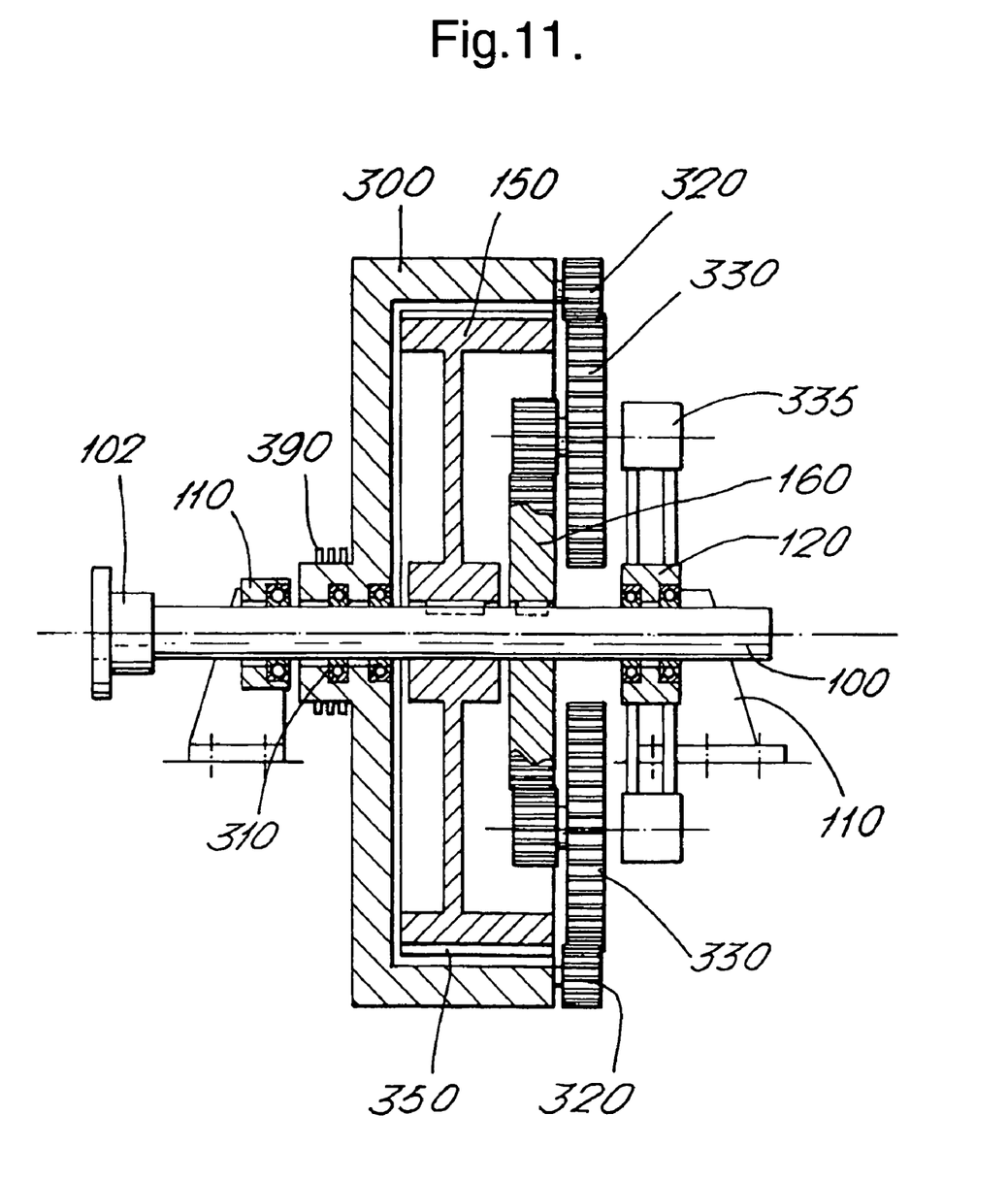
FIG. 11 shows a first embodiment of the generator according to the invention.

FIG. 11 shows one type of the generator according to the invention. A shaft 100, having connecting flange 102, is supported by radial and thrust bearings 110, 120. The flange 102 can be connected to a propeller if the generator is to generate electric power. A rotor 150 is fixedly connected to the rotor. Furthermore, a gearwheel 160 is connected to the shaft.

The gearwheel 160 engages with the driving gear bearing 335, which via the stator driving gear 330 and the gear rim 320 causes the stator 300 to rotate in the opposite direction relative to the shaft 100. FIG. 11 also shows stator bearings 310, permamagnets 350 and slip rings 390. The permamagnets can be replaced by, e.g., electromagnets without thereby departing from the invention.

The principle shows that the stator can be rotated in the opposite direction of the rotor, and generally at a greater speed than the rotor. Thus, a relative rotational speed is produced that is more than twice that at the input shaft. This makes it possible to utilise an optimal speed of the propellers which drive the generator. This means that the stator diameter can be made relatively small in order to obtain the necessary number of poles and frequency, and the diameter of the machinery housing is kept to a minimum in order to obtain least possible resistance and unfavourable currents in the water. (Propellers are alternately on one side or the other of the machinery housing as the water flow changes direction.) Since the AC voltage is in any case rectified in this type of power production in order to subsequently be converted to alternating current, there is no need for constant frequency. The requirement is maximum efficiency from approximately zero to maximum speed of the propeller acting on the generator (maximum between 10 and 15 rpm) in connection with the fact that the tide cycle varies.

Figure 12:
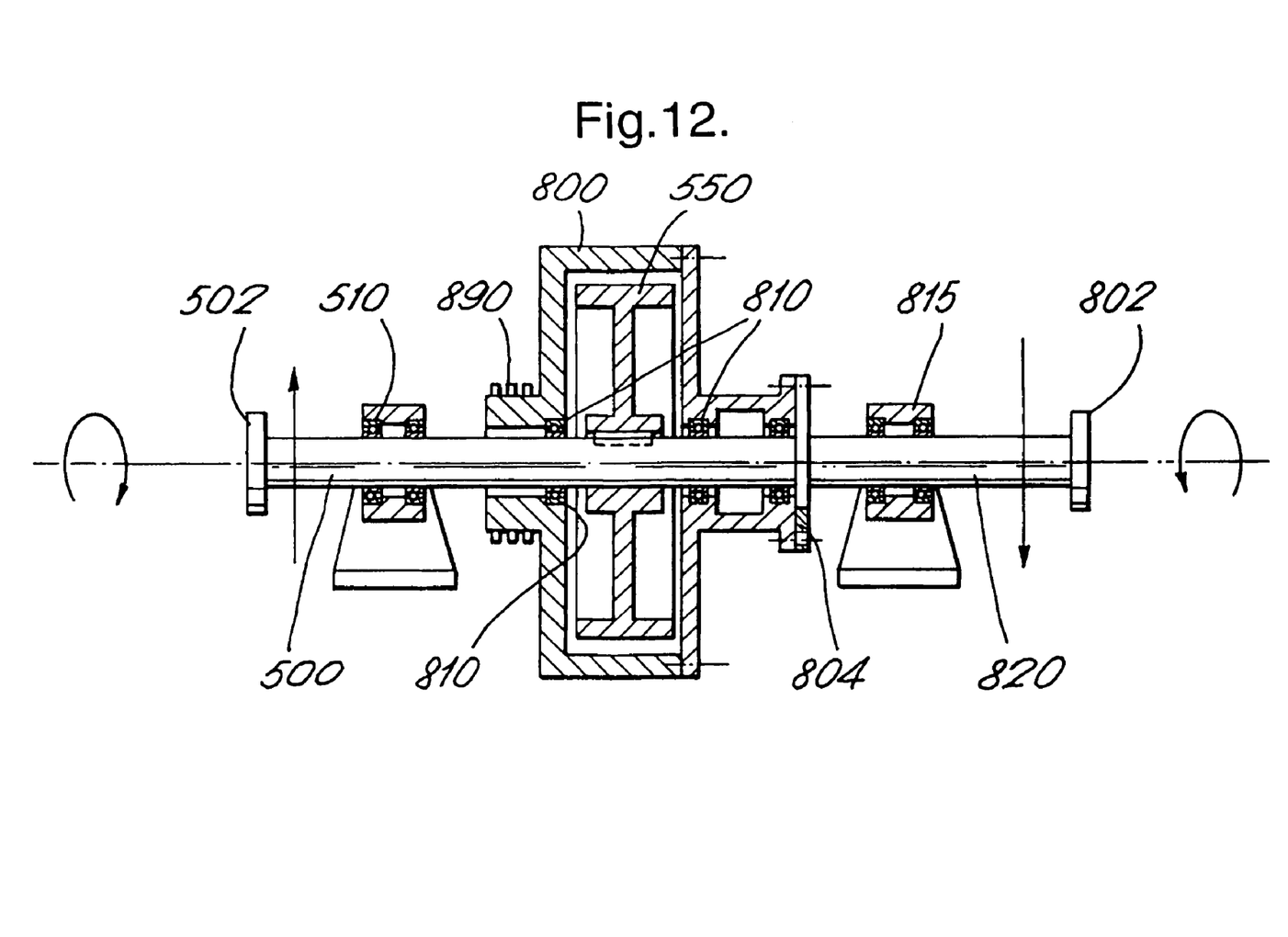
FIG. 12 shows a second embodiment of the generator according to the invention.

FIG. 12 shows another type of generator according to the invention. The generator comprises a rotor 550 connected to a first shaft 500 for rotation relative to a rotating stator 800 connected to a second shaft 820, and with respective bearings 510, 815.

The second shaft 820 is at one end thereof connected to a stator frame via a flange 804, axially supported 810 on the first shaft 500, and the first shaft 500 is at one end thereof axially supported 810 in said stator frame.

The first shaft 500 may be connected to a first propeller or turbine via a connection 502, and the second shaft 800 may be connected to a second propeller or turbine via a connection 802. Slip rings 890 that are known per se are mounted on the stator frame.

The following example illustrates the advantage of using a direct-driven generator having contra-rotation, compared with a conventional generator, without contra-rotation, but having the same diameter and output.

A mechanical gear solution between the generator and propeller has advantages at relatively small outputs, where a standard mass-produced generator can be used, and where the input (driving) shaft has a relatively high speed (more than 20 to 30 rpm).

Known technology for direct drive of a generator is most appropriate at larger outputs, and where large diameter and weight of the generator itself are of no particular importance. If the gear weight is deducted, the total weight will still be favourable provided the input speed is not particularly low. Although constant frequency is not required, "air gap speed" and area will determine the dimensions (provide design basis) for diameter and width (length of the generator).

If a direct-driven generator is contra-rotated at, e.g., 10 rpm of the rotor and stator respectively, this will give a relative rotational speed in the air gap which is the sum of the speed of the rotor and the speed of the stator, in this case 20 rpm, but the speed might easily be different between rotor/stator.

Let us consider, e.g., a generator size of 350 kW. The length is set at 0.75 meters and drive speed at 12.5 rpm. The required diameter is calculated on the basis of the following formula:

$$P = k \times D^2 L n$$

wherein: P is output (kW)
k is a constant valid for a given class of structures, in this case set at 2.2
D is air gap diameter (meters)
L is the length of the rotor and/or stator (meters)
n is speed (rpm)

The air gap diameter in a standard solution as specified will be 4.12 meters. The area of the magnet will be a total of 9.7 m².

If the stator and rotor are rotated in opposite directions, the relative speed will be 25 rpm. The air gap diameter could thus be reduced to 2.91 meters. At larger outputs, the differences will be even greater.

Alternatively, the gearing (the reverse gear box between rotor and stator) can be provided with a gear train. At a gearing ratio of 1:1.5, the relative speed will be 31.25 rpm.

The air gap diameter at this speed can be reduced to 2.60 meters and the magnet area can be reduced to 6.12 m².

The drawing of current from a generator with contra-rotation must be effected via slip rings, but with the use of known solutions.

If the contra-rotation is arranged with split operation—in that two propellers drive the generator (see FIG. 2), one the rotor and the other the stator, it will be possible to obtain the following:

1. Output of the generator is set in this example at 2×350 kW=700 kW.
2. Propeller speed of 12.5 rpm is selected—relatively this gives 25 rpm.
3. The length of the generator is set at 1.0 meters.

The diameter of the air gap for this solution is 3.18 meters and the magnet area is 9.78 m². That means to say the same area and costs for permanent magnets and coils as for a standard direct-driven generator of 350 kW having a diameter of 4.12 meters and a length of 0.75 meters.

Although a close study of all the details has not been made, a preliminary analysis of this type of generator operation shows a reduction in the price of electricity of about 10% compared with a concept including a "gear solution". This assumes a 100% shadow for propeller No. 2, which is not realistic as the distance between these is 10 meters.

Furthermore, there will probably be positive output for propeller No. 2 as the body of water will be made to rotate by propeller No. 1, which rotates in the opposite direction to propeller No. 2.

The solution provides a great improvement as regards operating safety and maintenance. Savings are estimated to be 0.5 øre per kWh/year—which is perhaps a rather conservative estimation.

The generator according to the invention allows large torques to be utilised.

The utilisation of large torques results in optimal efficiency for both the propeller (rotating member) and the generator. Omission of the gear results in a saving of more than 3% loss.

Furthermore, larger generator capacity can be installed.

The risk of overloads in the event of a breakdown or failure of the control system for controlling torque, thrust and output is smaller.

The arrangement results in reduced maintenance costs compared with existing generator solutions.

Traditionally, it is the gear, or the direct-drive generator, which takes up the torque from the propeller. Furthermore, it is one or more thrust bearings which take up axial forces. Thus, these forces are transmitted via the base to the machinery housing and then to the steel structure.

For a wind turbine, this type of torque will give varying loads on the bearing of the "nacelle" and result in the slew ring bearing being an exposed element.

Because two propellers rotate in opposite directions, individual adjustment of the number of revolutions of the propellers will allow the same torque on both shafts to be maintained, although one propeller works in the shadow of the other.

The solution means that the torques offset each other, and that the torque loads on the fixed support disappear. At the same time, pulsating loads from the propellers are cushioned by the "magnet cushion" between the rotor and the stator.

It should also be noted that the generator according to the invention will be simple to build. It can to a great extent be based on prefabricated windings and inexpensive permanent magnets.

Although the generator according to the invention in this application is described as a generator for electric power, the generator can also function as an electromotor, where, e.g., the shafts 500, 820 each drive a contra-rotating propeller. Such units can be used in air and in water, and may be particularly suitable in so-called pod thrusters in ships and other vessels.

List of Components Shown in the Figures

| chgd. | orig. | |
|---|---|---|
| | 600 | control room |
| | 610 | float member |
| | 615 | supporting arms |
| | 616 | joints |
| | 617 | mooring element |
| | 620 | supporting structure |
| 700 | 100 | nodal element |
| 710 | 110 | strut |
| 711 | 111 | upper bushing |
| 712 | 112 | lower bushing |
| 720 | 120 | horizontal supporting member |
| 730 | 130 | connecting member |
| 740 | 200 | intermediate connecting member |
| 749 | 300 | vertical supporting member |
| 750 | 350 | generator unit |
| 752 | 352 | generator housing |
| | 400 | rotating member |
| | 405 | shaft |
| | 406 | tip |
| | 407 | inner end facing hub |
| | 410 | member section |
| | 411 | forward servo rudder |
| | 412 | rear servo rudder |
| | 413 | rudder axle |
| | 414 | seal between member section and servo rudder |
| | 415 | actuator |
| B | 500 | bottom below the water |

-continued

| chgd. | orig. | |
|---|---|---|
| S | 550 | surface of the water |
| 760 | 600 | supporting legs |
| | 100 | shaft |
| | 102 | connecting flange |
| | 110 | shaft bearing (is secured) |
| | 120 | shaft bearing |
| | 150 | rotor |
| | 160 | gearwheel |
| | 300 | stator |
| | 310 | stator bearing |
| | 320 | stator gear rim |
| | 330 | stator driving gear |
| | 335 | driving gear bearing |
| | 350 | permamagnets |
| | 390 | slip rings |
| | 500 | rotor shaft |
| | 502 | connecting flange |
| | 510 | shaft bearing (is secured) |
| | 550 | rotor |
| | 800 | stator |
| | 802 | connecting flange |
| | 804 | flange |
| | 810 | stator bearing |
| | 815 | shaft bearing (is secured) |
| | 820 | stator shaft |
| | 890 | slip rings |

The invention claimed is:

1. A floating plant for the production of power from currents in a body of water, comprising a supporting structure supported by at least one pair of float members which extend substantially laterally from said support structure, wherein the float members in each pair are arranged on opposite sides of the supporting structure, and that a plurality of supporting arms for carrying power generators extend laterally on each side of the supporting structure and generally transversely with respect to the supporting structure's longitudinal direction, each one of said supporting arms being pivotally attached to the supporting structure at one end and supporting a power generator along a second end.

2. A plant according to claim 1, characterised in that the supporting arms comprise at least one joint between their first and second ends, so that each supporting arm can be folded about the joint, in order thereby, concurrently with the swinging of the supporting arm about the pivotal connection of its first end with the structure, to raise the respective generator above the surface of the water.

3. A plant according to claim 1, characterised in that an individual generator unit is pivotally supported about a vertical axis at the second end of the respective supporting arm.

4. A plant according to claim 1, characterised in that an individual generator unit is fixedly mounted at the second end of the supporting arm.

5. A plant according to claim 1, characterised in that each generator unit includes a shaft which is equipped with at least one rotating member.

6. A plant according to claim 1, characterised in that each generator unit includes a shaft which is equipped with at least one rotating member rotationally mounted on each side of said generator.

7. A plant according to claim 5, characterised in that the rotating members are counter-rotating.

8. A plant according to claim 6, characterized in that the rotating members are counter-rotating.

9. A floating plant for the production of power from currents in a body of water, comprising:
   a supporting structure supported by at least one pair of float members extending from the support structure;
   a plurality of hinged supporting arms for carrying power generators which extend laterally on each side of the supporting structure and generally transversely with respect to the supporting structure's longitudinal direction, each one of said supporting arms being pivotally attached to the supporting structure at one end and supporting a power generator along a second end; and
   a hydraulic drive mechanism for folding said support arms to selectively raise or lower said generators.

10. A plant according to claim 9, characterised in that an individual generator unit is pivotally supported about a vertical axis at the second end of the respective support arm.

11. A plant according to claim 10, characterised in that each generator unit includes a shaft is equipped with at least one rotating member.

12. A plant according to claim 10, characterised in that each generator unit includes a shaft which is equipped with at least one rotating member rotationally mounted on each side of said generator.

13. A plant according to claim 11, characterised in that the rotating members are counter-rotating.

14. A plant according to claim 12, characterized in that the rotating members are counter-rotating.

* * * * *